(12) United States Patent
Swoboda

(10) Patent No.: US 7,097,024 B2
(45) Date of Patent: Aug. 29, 2006

(54) CONVEYING DEVICE FOR CONVEYING ARTICLES AND USE OF SUCH A CONVEYING DEVICE

(75) Inventor: Werner Swoboda, Böblingen (DE)

(73) Assignee: Eisenmann Maschinenbau, KG (Komplementar: Eisenmann-Stiftung), Boblingen (DE)

( * ) Notice: Subject to any disclaimer, the term of this patent is extended or adjusted under 35 U.S.C. 154(b) by 0 days.

(21) Appl. No.: 10/366,914

(22) Filed: Feb. 14, 2003

(65) Prior Publication Data

US 2003/0150697 A1   Aug. 14, 2003

(30) Foreign Application Priority Data

Feb. 14, 2002   (DE) ................. 102 05 991

(51) Int. Cl.
B65G 35/06 (2006.01)

(52) U.S. Cl. .............. 198/619; 104/290; 104/293

(58) Field of Classification Search ............. 198/619; 104/290, 292, 293
See application file for complete search history.

(56) References Cited

U.S. PATENT DOCUMENTS

| | | | |
|---|---|---|---|
| 4,841,869 A * | 6/1989 | Takeuchi et al. ........... | 104/292 |
| 4,894,909 A | 1/1990 | Sakamoto et al. | |
| 5,005,487 A * | 4/1991 | Ohmura et al. ............. | 104/292 |
| 5,121,830 A | 6/1992 | Sakamoto et al. | |
| 5,551,350 A * | 9/1996 | Yamada et al. ............. | 104/293 |
| 5,668,421 A | 9/1997 | Gladish | |
| 6,591,756 B1 * | 7/2003 | Mayer et al. ............... | 104/290 |

FOREIGN PATENT DOCUMENTS

| | | |
|---|---|---|
| DE | 37 02 248 | 8/1987 |
| DE | 299 08 094 | 11/2000 |
| EP | 0 400 663 | 12/1990 |
| JP | 01119488 | 5/1989 |
| JP | 03066531 | 3/1991 |
| JP | 07231515 | 8/1995 |
| JP | 2000043769 | 2/2000 |

* cited by examiner

Primary Examiner—Douglas Hess
(74) Attorney, Agent, or Firm—The Watson IP Group, PLC; Jovan N. Jovanovic; Viadan M. Vasiljevic

(57) ABSTRACT

A conveying device for conveying articles, in particular vehicle bodies, in a known manner comprises at least one skid, which comprises two parallel skid runners and a supporting structure, which connects the skid runners to one another, for the article to be conveyed. The skid runners are supported on two parallel tracks, which extend along a conveying path. As a driving device a linear drive is used, which comprises a plurality of energizable primary parts disposed in a stationary manner along the conveying path. Provided on each skid is a secondary part, which interacts with the actually adjacent primary part. The length of the secondary part in conveying direction is tuned to the distance between the primary parts such that at least one primary part is disposed in the immediate vicinity of the secondary part.

5 Claims, 6 Drawing Sheets

CONVEYING DEVICE FOR CONVEYING ARTICLES AND USE OF SUCH A CONVEYING DEVICE

BACKGROUND OF THE INVENTION

1. Field of the Invention

The invention relates to a conveying device for conveying articles, in particular vehicle bodies, comprising at least one skid, two parallel tracks and a driving device. The skid comprises two parallel skid runners and a supporting structure, which connects the skid runners to one another, for at least one article to be conveyed on the skid. The parallel tracks extend along a conveying path. Skid runners of the at least one skid are supported on the parallel tracks. The skid is moved along the tracks by the driving device. The invention further comprises a method of using such a conveying device.

2. Background Art

Particularly in the automobile industry vehicle bodies are generally accommodated on so-called "skids" and conveyed on said carriers by means of roller tracks and/or carrying-chain conveyors through the body assembly shop, the paint shop and occasionally also through the final assembly stage. The roller tracks are driven by geared motors and/or chains and/or synchronous belt drives and therefore comprise components, which are subject to wear and occasionally require servicing.

This applies to a greater extent also to the carrying-chain conveyors. Here, lubrication of the chains is additionally required, which leads to an increased outlay both for the initial start-up, the setting of the lubricating cycles and for servicing. Abrasive wear of the chain support strips and fouling of the conveyors by the lubricants are problems which, particularly also in the processing areas, adversely affect the process result, including e.g. the quality of the surface coating of the vehicle bodies, as a result of dirt particles, grease, oil molecules in the ambient air etc.

The known conveying devices of the initially described type have the added drawback that, where they run through treatment stations disposed in booths, shafts have to be passed through the booth walls. Furthermore, between the two tracks, on which the skid runners are supported, transversely extending continuous shafts are required as power connection elements. In the case of roller tracks, one such shaft is required for each roller pair and, in the case of carrying-chain conveyors, one shaft is required for each driving gear pair. Thus, inside the conveying device there are no continuous free spaces available, which might be used for passages or inspections on foot. In addition, for taking up changes in length due to temperature variations costly tension stations are required which, like the driving stations, take up a considerable amount of room.

The object of the present invention is to develop a conveying device of the initially described type in such a way that, on the whole, it requires less maintenance and is less at risk of fouling.

SUMMARY OF THE INVENTION

Said object is achieved according to the invention in that the driving device comprises a linear drive. The linear drive comprises a plurality of energizable primary parts disposed in a stationary manner along the conveying path. On each skid, a secondary part interacts with the actually adjacent primary part. The length of the secondary part in conveying direction is tuned to the distance between the primary parts in such a way that there is always at least one primary part disposed in the immediate vicinity of the secondary part.

The use according to the invention of a linear drive as a driving device dispenses with all of the previous moving, current-carrying drive components. This alone considerably reduces the maintenance requirement. The linear drive requires no lubrication whatsoever and therefore does not involve a risk of fouling. From a control engineering viewpoint also, the linear drive used according to the invention as a driving device offers advantages because only the primary parts actually adjacent to the moving skid need be suitably energized. Thus, individual control of the individual skids is possible; both a continuous and a pulsed mode of travel of the individual skids is possible.

Where required, however, a plurality of skids may also be moved "en masse" at a common, identical speed and at specific fixed intervals.

Each primary part is advantageously pressable with the aid of a spring device in the direction of the secondary part of the actually adjacent skid. It is thereby ensured that there is only a small gap between the interacting primary and secondary parts of the linear drive, because larger gaps lead to a rapid drop in the efficiency of the linear drive.

Primary and secondary parts should not, however, lie directly adjacent to one another either. For said reason an embodiment is particularly recommendable, in which each primary part comprises a device, which guarantees a constant, small gap between the adjacent surfaces of the primary part and the actually adjacent secondary part.

A suitable device for said purpose comprises at least one distance roller, which is mounted on the primary part and rolls along a part connected to the skid, preferably along the secondary part. The primary part is therefore pressed with the aid of the spring device in the direction of the secondary part until the distance roller is in abutment with the part connected to the skid.

In the simplest case, the linear drive may be disposed between the two tracks, on which the two skid runners are supported. The skid may then be of a totally conventional design; it is prepared for use in the conveying device according to the invention by attaching a secondary part to its underside.

Particularly preferred, however, is the embodiment of the invention, in which the linear drive is disposed in the region of at least one of the two tracks, on which the skid runners are supported, and in which for said purpose the secondary part of the at least one skid is disposed on at least one of the two skid runners. This produces a conveying device, in which no transverse connection whatsoever is required between the two tracks. Here, free spaces therefore arise, which may be utilized to run passages or walkways.

The skids used for said embodiment do admittedly differ in their design from conventional skids; however, outside of the conveying device according to the invention they are nevertheless fully interchangeable with conventional skids and are therefore universally capable of performing their function.

The primary parts may in said case be integrated into one of the two tracks.

The primary parts and the at least one secondary part may in said case be fashioned as complementary profiles extending adjacent to one another. By said means, on the one hand a specific guiding action of the skid, which is effected by means of the profiled primary and secondary parts, is achieved and on the other hand a relatively large area of interaction between the primary parts and the secondary parts is provided.

It is constructionally simpler when the mutually opposing surfaces of the primary parts and of the at least one secondary part are flat. In said embodiment the lateral guidance of the skid on the tracks has to be guaranteed in some other manner; furthermore, because the interacting surfaces are possibly not as large, a slightly more powerful energizing of the primary parts is required.

A very advantageous development of the invention is such that the secondary part of the at least one skid is disposed on a lateral surface of the skid runner and the primary parts roll laterally along the secondary part. Such a linear drive becomes, in terms of the proportions, higher and has lower winding losses.

In an, in practice, rugged embodiment of the invention the tracks, on which the skid runners are supported, are roller rails each comprising a plurality of freely rotating support rollers. Said roller rails therefore differ from the conventional roller tracks used as skid conveying devices in that the support rollers are not driven, nor are opposite-lying support rollers connected to one another by shafts.

The distances between the support rollers should in said case be tuned to the length of the skid runners in such a way that each skid runner is always in contact with at least three support rollers.

In said case it may be advantageous when the primary parts are integrated into the roller rail between the support rollers. This results in roller rails, which may be preassembled as a compact, integrated unit in the works and therefore merely requires fastening at the installation site.

For a somewhat greater outlay it is also possible for the skid runners to be supported without contact on the tracks. In said case, the conveying device according to the invention practically no longer has any moving elements; wear and the risk of fouling are negligible.

For said purpose, the skid runners may be supported via an air cushion and/or a magnetic field on the tracks.

The advantages of the conveying system according to the invention yield benefits particularly when the system is used to convey articles through a drier. Especially in driers it is extremely important to introduce as few interfering substances as possible, particularly substances which interfere with the surface wetting. The inward transfer of lubricants and dirt is absolutely to be avoided, which the conveying devices according to the invention manage to do extremely well. As the conveying devices according to the invention hardly impede the circulation of the hot air in the drier, the air of the drier has particularly good access to the articles to be dried. Generally, given use of the conveying devices according to the invention, the air circulation through the drier is better than was the case with the prior art. As the primary parts of the linear drive are exposed in the drier to the heat of the drier, separate cooling of said primary parts is recommended.

BRIEF DESCRIPTION OF THE DRAWINGS

There now follows a detailed description of embodiments of the invention with reference to the drawings, wherein, FIG. 1 the side view of a detail of a first embodiment of a skid conveying system.

DETAILED DESCRIPTION OF THE DRAWINGS

Figure 1:
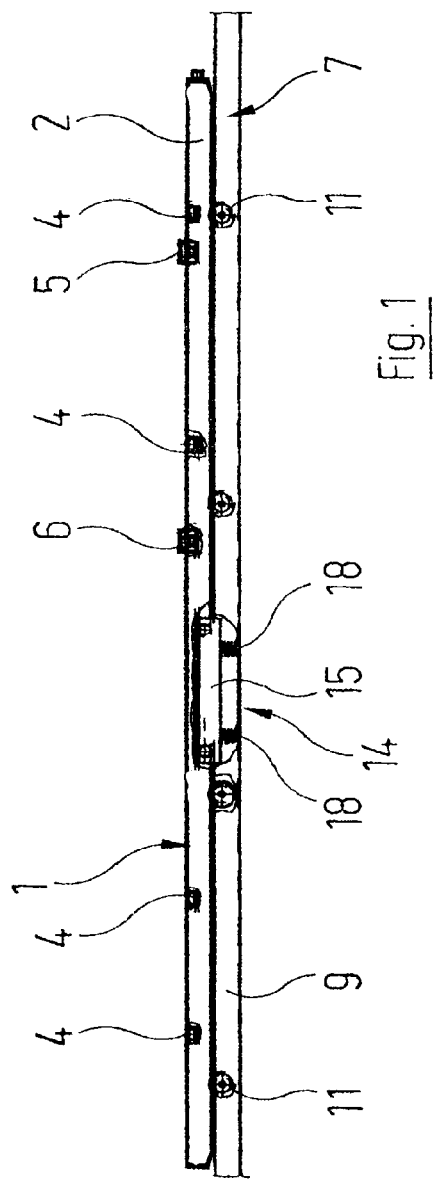

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

Figure 2:
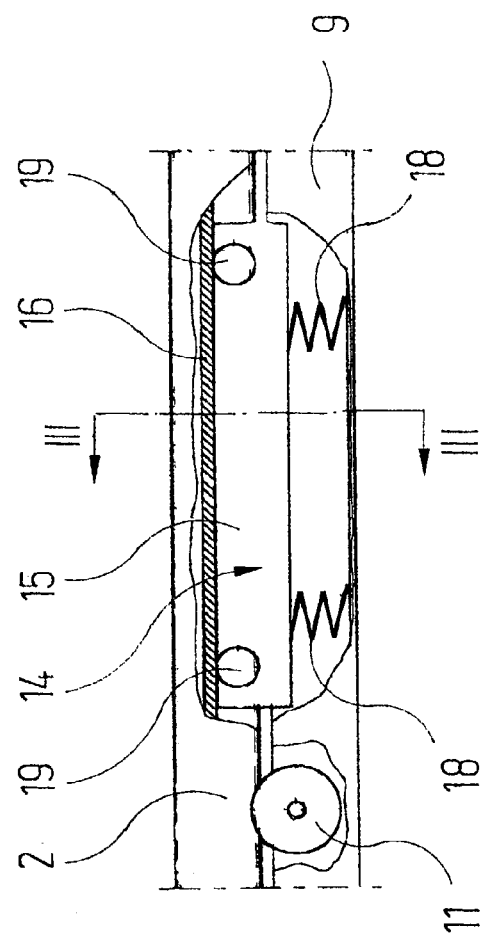
FIG. 2 a detail enlargement from FIG. 1.
Figure 3:
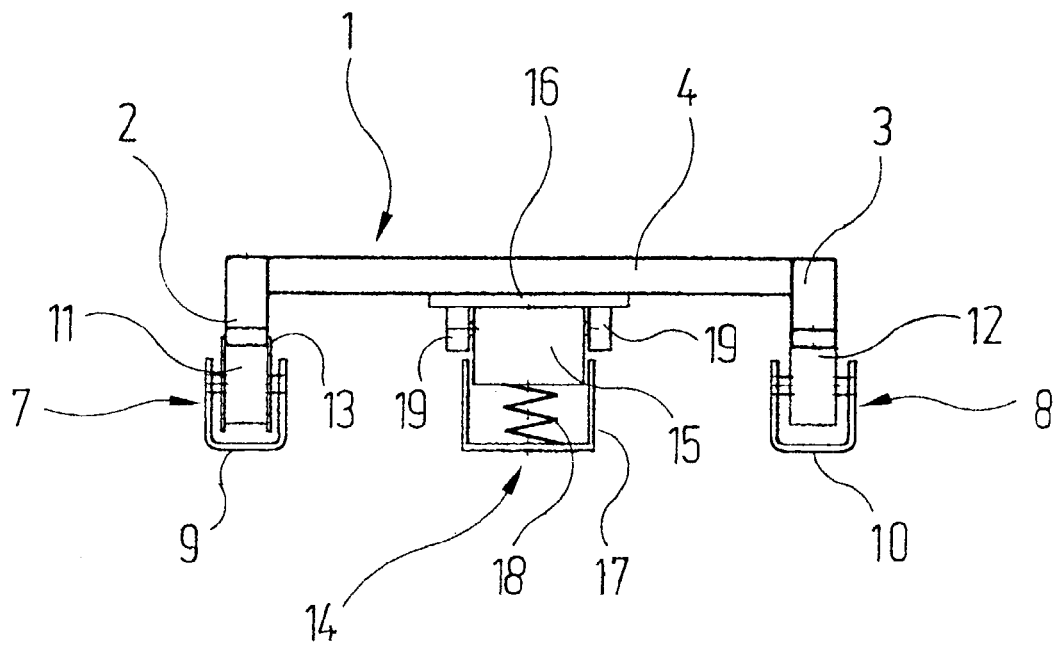
FIG. 3 a section along line III—III of FIG. 2.

In FIGS. 1 to 3 the reference character 1 denotes a skid, which is conventional in terms of its basic design. That is, the skid 1 comprises two parallel skid runners 2, 3 (cf. in particular also FIG. 3), which are connected to one another by crossmembers 4. The skid runners 2, 3 carry fastening means 5, 6 (cf. FIG. 1), to which a workpiece to be conveyed, e.g. a vehicle body, may be fastened.

The skid 1 is supported on two roller rails 7, 8, which also guide the skid 1. The roller rails 7, 8 are in turn mounted on a supporting structure, e.g. on a steel structure or on the floor of the room, parallel to one another at a distance corresponding to the distance between the two skid runners 2, 3. Each roller rail 7, 8 has a U-shaped profile 9, 10, which is attached to the supporting structure and in which in the illustrated manner support rollers 11, 12 are mounted in a freely rotatable manner at regular intervals. The skid runners 2, 3 of the skid 1 in said case rest against the lateral surfaces of the support rollers 11, 12, wherein the support rollers 11 of one of the two roller rails, namely the roller rail 7 on the left in FIG. 3, are provided with projecting wheel flanges 13, which effect lateral guidance of the skid 1. The support rollers 12 of the opposite roller rail 8, which is on the right in FIG. 3, do not carry such wheel flanges so that, here, a specific lateral excursion of the skid runner 3 relative to the support rollers 12 is possible. This reduces the standards of accuracy required for laying the roller rails 7, 8.

The support rollers 11, 12 in their respective roller rails 7, 8 are at such a distance from one another that each skid runner 2, 3 is supported on at least three, in the illustrated embodiment on four, support rollers 11, 12. As already mentioned, the support rollers 11, 12 in the track rails 7, 8 are freely rotatable, i.e. are in particular not driven by an external drive shaft. Rather, as a drive for the skid 1 a linear drive is used, which is provided as a whole with the reference character 14. The linear drive 14 comprises a plurality of primary parts 15, which are mounted in a stationary manner at intervals along the path of motion of the skid 1, mid-way between the roller rails 7, 8 on the supporting structure. The distances between the primary parts 15, which may be energized in a suitable manner, in said case do not exceed the length of the skid runners 2, 3 of the skids 1 so that each skid 1 moving along the roller rails 7, 8 is always in the vicinity of at least one primary part 15.

A secondary part 16 of the linear drive 14 is mounted in a fixed manner on the underside of the skid 1, mid-way between the skid runners 2, 3, and interacts with the primary part 15. Between the secondary part 16 and the primary part 15 a constant operating gap of e.g. one millimetre is maintained in the following manner:

All of the primary parts 15 of the linear drive 14 are guided in a vertically movable manner in U-shaped profiles 17, which in turn are fastened on the supporting structure. Two compression springs 18, which are braced between the base of the U-shaped profile 17 and the underside of the primary part 15, attempt to press the primary part 15 up towards the secondary part 16 connected to the skid 1. The desired, constant gap between the primary part 15 and the secondary part 16 is maintained by means of a total of four distance rollers 19, which are rotatably mounted in pairs on opposite lateral surfaces of the primary part 15 at an appropriate distance from the top of the latter and roll along the underside of the secondary part 16.

The linear drive 14 may be designed e.g. in the style of an asynchronous motor, a reluctance motor or a synchronous motor.

The mode of operation of the skid conveying device described above is as follows:

The individual skids 1 rest loosely under their own weight and the weight of the conveyed article on the support rollers 11, 12 of the two roller rails 7, 8. When they are to be moved, the primary parts 15 of the linear drive 14 actually situated under the respective skid 1 are energized. The forces developing between the primary part 15 and the secondary part 16 of the skid 1 set the skid 1 in motion along the roller rails 7, 8.

In principle, each skid 1 situated on the roller rails 7, 8 may be moved individually in said manner, wherein both a continuous and a pulsed mode of travel of the individual skids 1 is possible. The skids 1 are moved with the aid of the illustrated conveying system along the entire assembly line, even through the interiors of treatment booths such as drying booths, paint booths or other processing plant regions. Along longer conveying sections and/or inside booths a plurality of skids 1 are preferably conveyed "en masse", i.e. at a constant, identical speed and at specific intervals.

Figure 4:
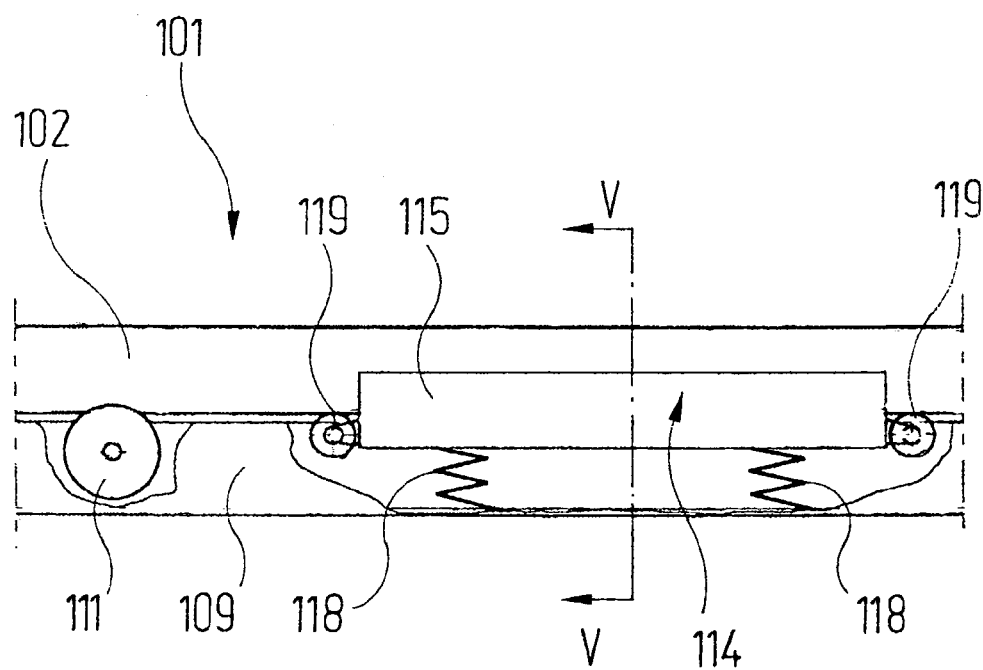
FIG. 4 a view similar to FIG. 2 but of a second embodiment of a skid conveying system.
Figure 5:
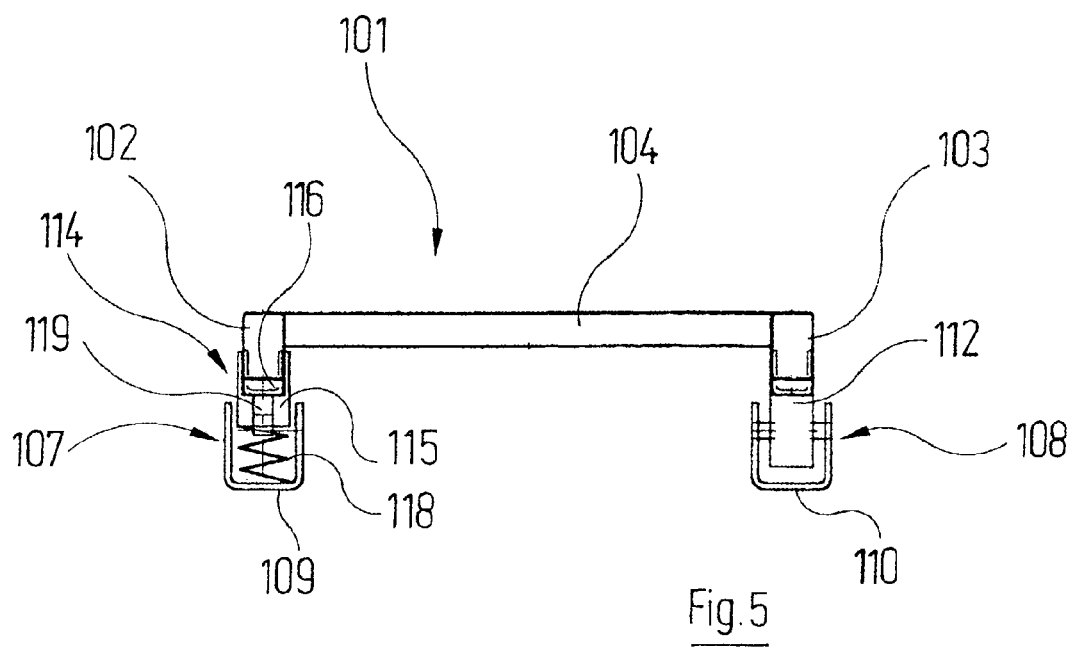
FIG. 5 a section along line V—V of FIG. 4.

FIGS. 4 and 5 show a second embodiment of a skid conveying device, which is very similar to the one described above with reference to FIGS. 1 to 3. Corresponding parts are therefore denoted by the same reference character plus 100.

The design of the skid 101 of FIGS. 4 and 5 corresponds to that of the skid 1 of FIGS. 1 to 3 insofar as it too has two parallel skid runners 102, 103, which are connected to one another by crossmembers 104 and have suitable fastening means for the fastening of an article. The skid runners 102, 103 are likewise supported and guided on roller rails 107, 108, which extend parallel to one another at the same distance apart as the skid runners 102, 103 along the conveying path. Each of the roller rails 107, 108 comprises a plurality of freely rotatable and non-driven support rollers 111, 112, which are disposed at suitable intervals and on which the undersides of the skid runners 102, 103 are supported.

Unlike the embodiment of FIGS. 1 to 3, the linear drive 114 effecting the forward motion of the skids 101 is disposed, not mid-way between the roller rails 107, 108 and/or mid-way between the skid runners 102, 103, but on one side of the conveying device in the following manner:

The various primary parts 115 of the linear drive 114 are integrated into the roller rail 107 on the left in FIG. 5 in that they are inserted, likewise at the appropriate distances from one another, between adjacent support rollers 111 of said roller rail 107. As is evident from FIG. 5, the primary parts 115 are shaped in the upper region into the form of an upwardly open U and are pressed upwards by, in each case, two compression springs 118 braced between the base of the U-shaped profile 109 of the roller rail 107 and the underside of each primary part 115. The secondary part 116 of the linear drive 114 extends substantially over the entire length of the skid 101 and is integrated as a U-shaped profile into the bottom region of the, in FIG. 5, left skid runner 102 adjacent to the roller rail 107. The primary part 115 of the linear drive 114 in said case surrounds the secondary part 116 in the skid runner 102, leaving a small gap which may be, for example, likewise 1 mm.

Once again, in order to maintain the desired, constant gap between the underside of the secondary part 116 fastened in the skid runner 102 and the base of the U-shaped profile in the primary parts 115, distance rollers 119 are provided. As is evident particularly from FIG. 4, said distance rollers 119 are mounted on extension arms 120, 121, which are attached to the two end faces of each primary part 115 and support the distance rollers at the correct height in front of and behind the primary part 115.

The mode of operation of the second skid conveying system illustrated in FIGS. 4 and 5 is totally identical to that of the embodiment of FIGS. 1 to 3. The advantage of the embodiment of FIGS. 4 and 5 is, however, that the space between the two roller rails 107, 108 is completely free. Here, therefore, free spaces are available, in which passages may be accommodated or inspections on foot carried out.

The roller rails 107, 108 are compact, self-contained units, which may be completely preassembled in the works, transported as such to the installation site and fastened there to the supporting structure.

Instead of the illustrated U-shaped profile the primary parts 115 may have an L-shaped profile, i.e. enclose the adjacent skid runner 102 only on two sides, thereby reducing the accuracy requirements during assembly.

Figure 6:
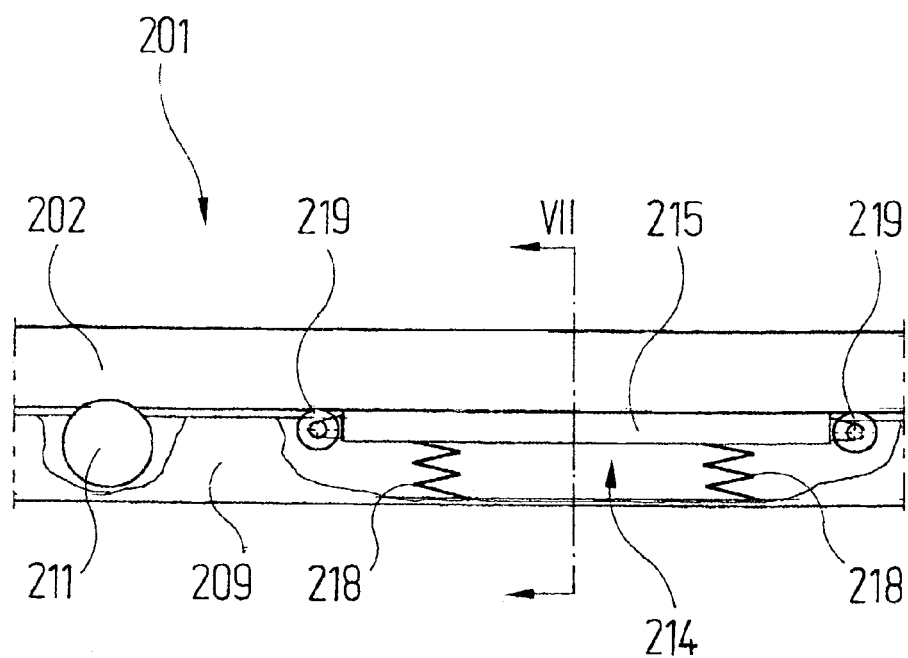
FIG. 6 a view similar to FIGS. 3 and 4 but of a third embodiment of a skid conveying system.
Figure 7:
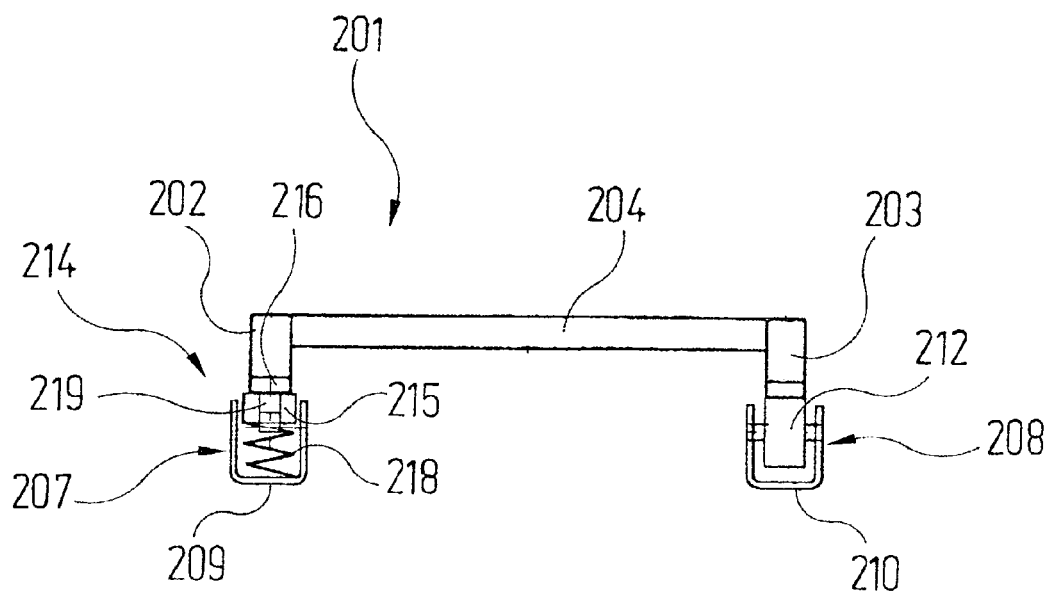
FIG. 7 a section along line VII—VII of FIG. 6.

FIGS. 6 and 7 show a third embodiment of a skid conveying system with linear drive, which is very similar to that of FIGS. 4 and 5. Corresponding parts are therefore denoted by the same reference character as there, but once more increased by 100.

In the embodiment of FIGS. 6 and 7 also, the linear drive 214 is disposed eccentrically in the region of one of the two roller rails 207 and/or one of the two skid runners 202. The primary parts 215 of the linear drive 214 are once more inserted at the appropriate intervals between support rollers 211 of the roller rail 207 on the left in FIG. 7. The primary parts 215 are pressed upwards with the aid of compression springs 218, which are braced between the base of the U-shaped profile 209 of the roller rail 207 and the underside of the primary parts 215. Unlike the embodiment of FIGS. 4 and 5, the primary parts 215 and the secondary parts 216 of the linear drive 214 in FIGS. 6 and 7 are not designed as U-shaped profiles. Rather, the primary parts 215 have a flat top surface and the secondary parts 216 fastened to the skid runner 202 have a flat underside. Between said underside of the secondary parts 216 and the top surface of the primary parts 215 a constant small gap is maintained with the aid of distance rollers 219 in a manner corresponding to that of the second embodiment illustrated in FIGS. 4 and 5.

The mode of operation of the embodiment illustrated in FIGS. 6 and 7, as far as the nature of the forward propulsion of the skids 201 and possible control of the latter is concerned, is identical to that of the previously described embodiments. As in the embodiment of FIGS. 4 and 5, between the roller rails 207 and 208 a free space is available, which may be utilized for passages, inspections on foot or the like. The primary parts 215 and secondary parts 216 of the embodiment of FIGS. 6 and 7 are however of a somewhat simpler and hence more economical design than in the embodiment of FIGS. 4 and 5.

All of the embodiments have the advantage that the conveying system has only comparatively few moving parts and, in particular, no externally power-driven moving parts which require maintenance, e.g. lubrication.

The fourth embodiment of a skid conveying device illustrated in FIG. 8 is once again extremely similar to the previously described embodiments. Corresponding parts are therefore once more denoted by the same reference character, only once more increased by 100.

Figure 8:
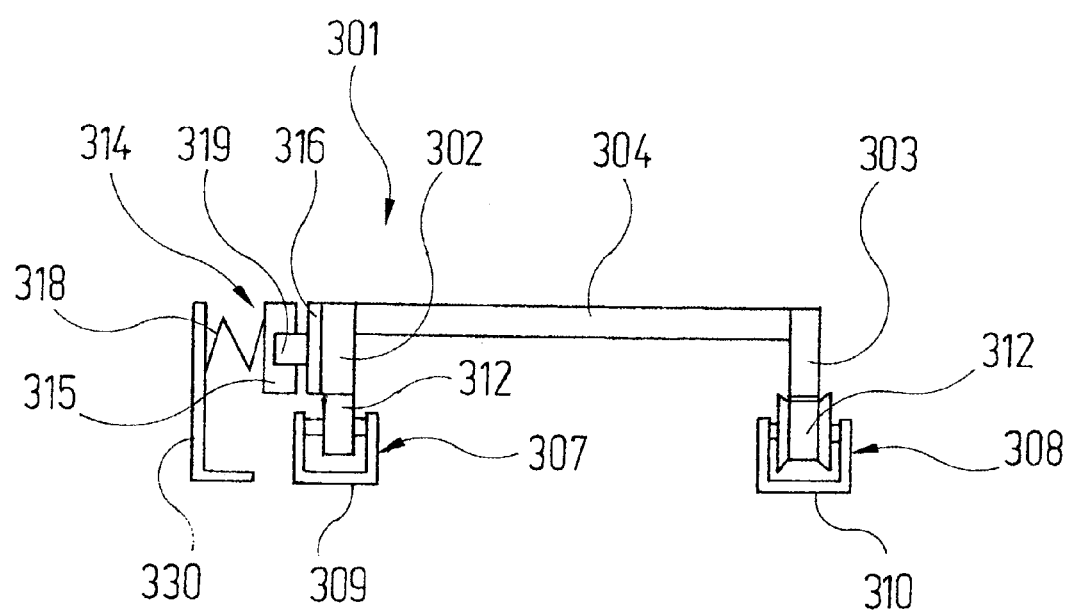
FIG. 8 a section similar to FIGS. 3, 5 and 7 through a fourth embodiment of a skid conveying system.

Said embodiment differs from that of FIGS. 6 and 7 in that the secondary part 316 of the skid 301 is attached, not to the underside, but to the outer lateral surface of the skid runner 302 disposed on the left in FIG. 8. Accordingly, the primary parts 315 roll via distance rollers 319 along the, in FIG. 8, left lateral surface of the secondary part 316, towards which surface they are pressed by compression springs 318. The compression springs 318 are in said case supported against a profiled rail 330, which extends along the roller rail 307 disposed on the left in FIG. 8. Said profiled rail 330 also, in a manner not illustrated in the drawing, guides the primary parts 315.

The advantage of said embodiment lies in the fact that the higher design of the linear drive 314 provides larger interacting surfaces, thereby reducing winding losses. What is more, the design of the roller track 307 is simpler because it does not need to support and guide the primary parts 315.

Figure 9:
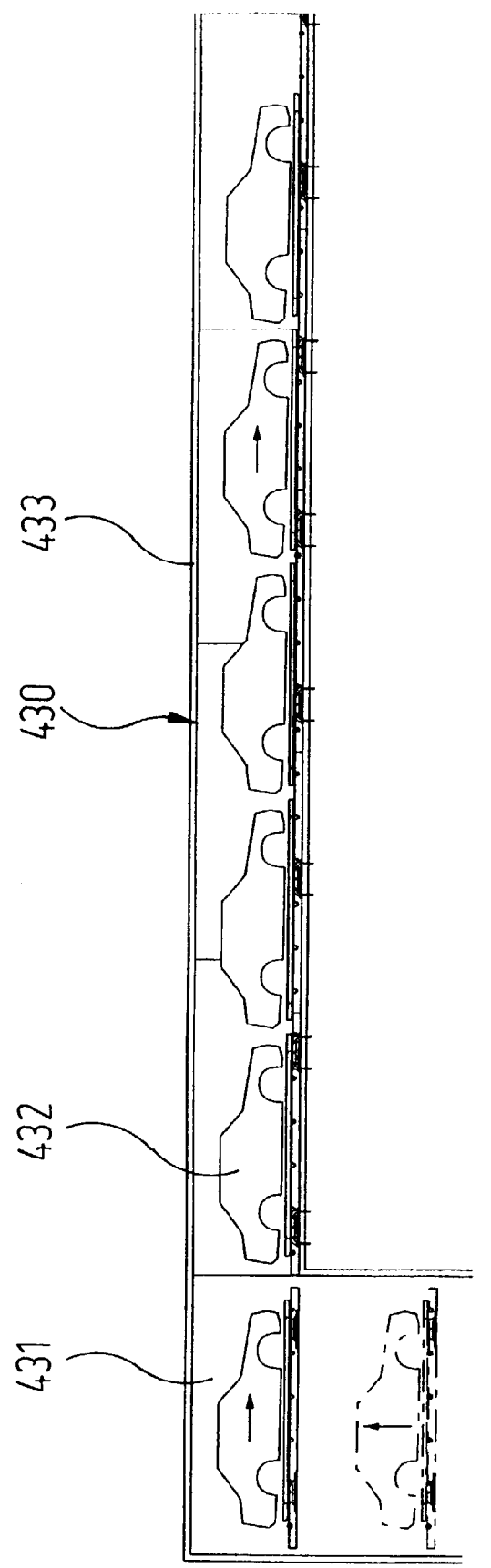
FIG. 9 a vertical section through a drier with a conveying device according to the invention.

FIG. 9 shows, in vertical section, a drier of the type used to dry freshly painted vehicle bodies 432. The drier comprises a drier housing 430, in each of the two end regions of which a lock 431 is provided. In the lock illustrated in FIG. 9 the vehicle bodies 432 are raised from the floor level, at which they are delivered, up to a higher level. In a corresponding lock, which is to be imagined at the non-illustrated right end of the drier housing 430 in FIG. 9, the vehicle bodies 432 are lowered to floor level again and conveyed onwards from there.

Between the two locks 431 the actual drier tunnel 433 extends at a specific height above the floor level. The drier tunnel 433, which is shown in enlarged scale in FIG. 10 in a section at right angles to the direction of motion of the vehicle bodies 432, contains lateral air diffusing areas 434, into which hot air may be introduced in a non-illustrated manner. Said hot air penetrates openings in the partitions 435 between the air diffusing areas 434 and the inner area, which lies between the latter and in which the vehicle bodies 432 are moving. The hot air then acts upon the vehicle bodies 432, heating them and in particular the freshly applied coat of paint and causing the latter to dry. The hot air is removed in the bottom region of the inner area 435 and recirculated via a radiator. Said operations are known as such.

In the inner area 435 of the drier tunnel 433 a conveying system of the type described above with reference to FIGS. 1 to 8 is used. The conveying system illustrated concretely in FIGS. 10 and 11 bears a close resemblance to the system of FIGS. 2 and 3, i.e. this conveying system also comprises two parallel roller rails 407, 408, wherein the support rollers 411 of the left roller rail 407 are provided with wheel flanges, while the support rollers 412 of the roller rail 408 on the right in the drawings are not. The skid runners 402, 403 of the skid 401 are supported on the support rollers 411, 412 of the two roller rails 407, 408.

Figure 10:
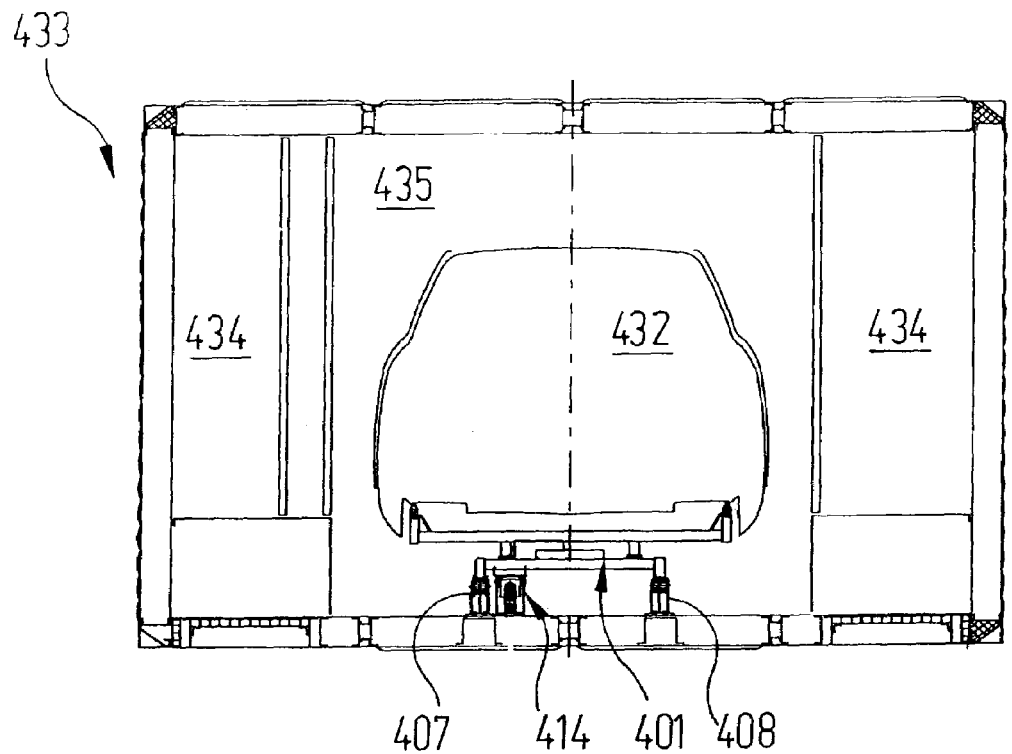
FIG. 10 a section through the drier of FIG. 9 at right angles to the direction of motion of the conveying device.
Figure 11:
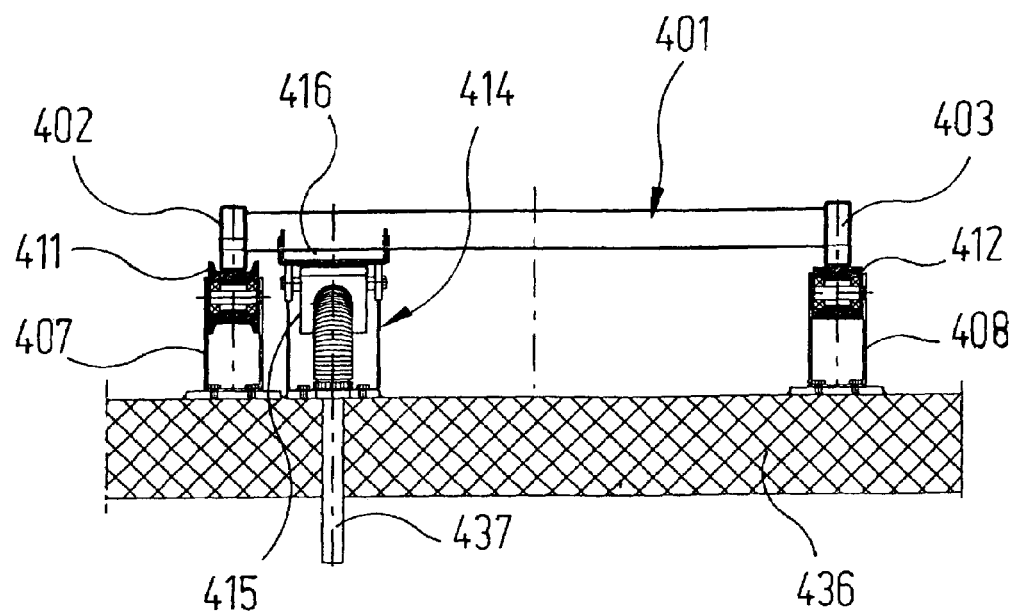
FIG. 11 a detail enlargement from FIG. 10.

Whereas in the conveying system of FIGS. 2 and 3 the linear drive 14 was disposed mid-way between the two roller rails 7, 8, the linear drive 414 of the embodiment of FIGS. 10 and 11 has been shifted slightly off-centre in the direction of the roller rail 407 disposed on the left in FIGS. 10 and 11. As a result, slightly more continuous free space is gained between the roller rails 407 and 408.

The roller rails 407, 408 as well as the primary parts 415 are mounted on the insulated floor 436 of the drier tunnel 433. The secondary parts 416 are once more attached to the underside of the skids 401.

The primary parts 415 of the linear drive 414, because they are situated in the hot-air-filled inner area 435 of the drier tunnel 433, have to be cooled. A suitable cooling medium, e.g. air or water, is fed to each primary part 415 through a line 437, which passes through the insulated floor 436 of the drier tunnel 433. A corresponding line removes the cooling medium which has passed the respective primary parts 415.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. Conveying device for conveying articles comprising:
   a) at least one skid, which comprises two parallel skid runners and a supporting structure, which connects the skid runners to one another, for at least one article to be conveyed on the skid;
   b) two parallel tracks, which extend along a conveying path and on which the skid runners of the at least one skid are supported; and
   c) a driving device having a linear drive, by means of which the skid may be moved along the tracks, the driving device further comprising:
      ca) a plurality of energizable primary parts disposed in a stationary manner along the conveying path;
      cb) on each skid a secondary part, which interacts with the actually adjacent primary part;
      wherein
      cc) the length of the secondary part in conveying direction is tuned to the distance between the primary parts in such a way that there is at least one primary part disposed in the immediate vicinity of the secondary part;
      cd) each primary part is pressed with the aid of a spring device in the direction of the secondary part of the actually adjacent skid; and
      ce) each primary part comprises a device, which guarantees a constant, small gap between the adjacent surfaces of the primary part and of the actually adjacent secondary part; and
   wherein
   d) the device comprises at least one distance roller, which is mounted on the primary part and rolls along a part connected to the skid, preferably along the secondary part.

2. Conveying device for conveying articles comprising:
   a) at least one skid, which comprises two parallel skid runners and a supporting structure, which connects the skid runners to one another, for at least one article to be conveyed on the skid;
   b) two parallel tracks, which extend along a conveying path and on which the skid runners of the at least one skid are supported; and
   c) a driving device having a linear drive, by means of which the skid may be moved along the tracks, the driving device further comprising:

ca) a plurality of energizable primary parts disposed in a stationary manner along the conveying path;
cb) on each skid a secondary part, which interacts with the actually adjacent primary part;
wherein
cc) the length of the secondary part in conveying direction is tuned to the distance between the primary parts in such a way that there is at least one primary part disposed in the immediate vicinity of the secondary part;
cd) each primary part is pressed with the aid of a spring device in the direction of the secondary part of the actually adjacent skid; and
ce) each primary part comprises a device, which guarantees a constant, small gap between the adjacent surfaces of the primary part and of the actually adjacent secondary part.

3. Conveying device according to claim 2, wherein the linear drive is disposed between the two tracks, on which the two skid runners are supported.

4. Conveying device according to claim 2, wherein the tracks, on which the skid runners are supported, are roller rails, which comprise in each case a plurality of freely rotating support rollers.

5. Conveying device according to claim 4, wherein the distances between the support rollers are tuned to the length of the skid runners in such a way that each skid runner is always in contact with at least three support rollers.

* * * * *